United States Patent [19]

Kelleher

[11] 4,340,949
[45] Jul. 20, 1982

[54] PROCESSOR CONTROLLED VIDEO DISC SERVO SYSTEM

[75] Inventor: Kevin C. Kelleher, Plainfield, Ind.

[73] Assignee: RCA Corporation, New York, N.Y.

[21] Appl. No.: 174,030

[22] Filed: Jul. 31, 1980

[51] Int. Cl.³ .......................... G11B 21/04; G11B 3/38
[52] U.S. Cl. ..................................... 369/33; 369/219; 369/244; 369/256
[58] Field of Search .................... 369/77, 33, 215, 219, 369/220, 221, 244, 249, 255, 256, 265, 271

[56] References Cited

U.S. PATENT DOCUMENTS

| | | | |
|---|---|---|---|
| 3,536,331 | 10/1970 | Goldmark | 369/221 |
| 3,572,724 | 3/1971 | Rabinow | 369/221 |
| 3,870,320 | 3/1975 | Torrington | 369/221 |
| 3,931,457 | 1/1976 | Mes | 369/221 |
| 4,059,277 | 11/1977 | De Stephanis | 369/221 |
| 4,124,216 | 11/1978 | Sörensen | 369/231 |
| 4,142,209 | 2/1979 | Hedlund et al. | 369/33 |
| 4,159,480 | 6/1979 | Tachi | 369/43 |
| 4,160,270 | 7/1979 | Goldschmidt et al. | 369/33 |
| 4,175,267 | 11/1979 | Tachi | 369/220 |
| 4,175,751 | 11/1979 | Huff | 369/221 |
| 4,183,059 | 1/1980 | Palmer | 369/43 |
| 4,185,836 | 1/1980 | Taylor et al. | 369/220 |
| 4,198,871 | 4/1980 | Dunn et al. | 74/337 |
| 4,199,149 | 4/1980 | Ohsawa | 369/220 |
| 4,249,746 | 2/1981 | Mimasu | 369/221 |
| 4,262,174 | 4/1981 | Bleazey | 369/221 |
| 4,280,023 | 7/1981 | Christopher | 369/219 |

FOREIGN PATENT DOCUMENTS 1361610 7/1974 United Kingdom .

Primary Examiner—Steven L. Stephan
Attorney, Agent, or Firm—E. M. Whitacre; J. S. Tripoli; E. P. Herrmann

[57] ABSTRACT

A video disc player is described wherein the signal pickup stylus is mounted in a carriage assembly that is advanced across the record in discreet steps, each step traversing a fixed number of information tracks. A digital processing unit, responsive to track identification numbers provides stimulus to a stepping motor to step the carriage each time the stylus has traced the fixed number of tracks.

8 Claims, 2 Drawing Figures

PROCESSOR CONTROLLED VIDEO DISC SERVO SYSTEM

The present invention relates to a video disc playback apparatus and in particular, to a system for advancing the signal recovery apparatus radially across the disc record.

Certain capacitive video disc systems incorporate record discs with information recorded by means of geometric variations in a conductive medium disposed in a spiral groove or in concentric tracks on the surface of a record disc. The record disc may comprise a basically conductive material with a thin dielectric layer disposed on its outer surfaces. A pickup or signal stylus supported at one end of a stylus arm, and having a conductive electrode engages and follows the track or groove. The stylus electrode and conductive record material form a capacitance, which capacitance varies in accordance with the geometric variations in the information track. Continuous capacitive changes resulting from rotating the disc to produce relative motion between the stylus and disc are detected and processed to produce video and/or audio signals for reproduction.

Video disc systems of the aforementioned type may utilize disc records having track or groove densities in the order of four to eight thousand groove convolutions per inch, and in some cases, close to ten thousand groove convolutions per inch. A typical video disc record of this type may have a track or groove convolution spacing in the order of 2.7 microns. A consequence of the high track density with respect to the grooved records is that the grooves are concomitantly very shallow, too shallow to reliably pull the weight of the pickup arm assembly radially across the entire recorded surface of the disc record. In addition, it is desirable for accurate reproduction of the prerecorded signals that the signal pickup stylus maintain a substantially constant attitude with respect to the information track. Therefore, the stylus supporting structure, or carriage, includes a drive mechanism for uniformily traversing the supported end of the stylus arm in proper time relationship with the radial motion of the signal pickup stylus engaging the track.

Originally carriage assemblies were driven by a lead screw coupled with the turntable drive mechanism. However, to achieve play options such as stop motion, reverse scan, etc., the mechanical structure became undesirably complicated; see U.S. Pat. No. 4,175,751 entitled "Toggle Mechanism For Video Disc Player." To overcome this complication, the lead screw was replaced with a reversible motor. The carriage motion was coordinated with the radial tracking of the pickup stylus by continuously detecting the attitude of the stylus/stylus arm assembly with respect to the carriage via a position sensitive capacitor mounted between the stylus and the carriage, to produce a control signal for driving the motor. The signal detection means and the control signal generation process in this system are incorporated in the normal signal recovery means. This tends to complicate the electronics and may generate undesired signal products in the recovered signal.

The present inventor discovered that the carriage assembly supporting the signal pickup stylus in a groove tracking disc record system could be translated radially across the disc in a non-uniform or stepped mode without jarring the stylus from the groove. The ability to translate the carriage in discreet increments provides the opportunity to realize a system without the above shortcomings.

In accordance with the present invention, a signal pickup stylus is secured to a stylus arm which in turn is mounted to a carriage assembly. For a grooved disc system wherein the stylus engages the grooves and the forces developed between the stylus and groove walls tend to translate the stylus radially across the disc record, the stylus arm-carriage mounting is highly compliant to permit relative lateral or radial movement between the signal pickup stylus and the carriage. A stepper motor direct coupled to the carriage assembly laterally advances the carriage by discreet steps responsive to control pulses. A microprocessor or counting system monitors the track address numbers recorded on the disc within the video signal and produces the control pulses to operate the stepper motor each time the stylus has traversed the requisite number of convolutions.

Figure 1:
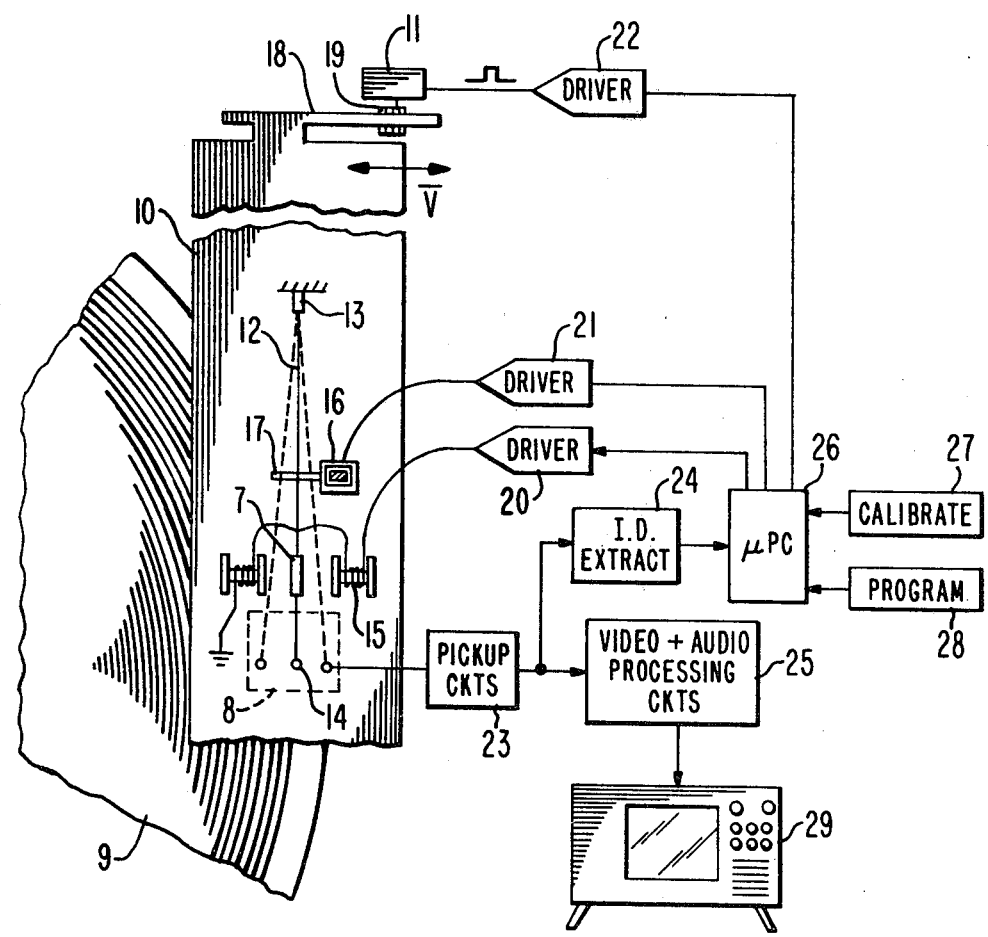
FIG. 1 is a partial schematic; partial block diagram of a video disc player embodying the present invention.

Referring to the player apparatus of FIG. 1 a signal pickup stylus 14 is secured to a stylus arm 12, which is mounted in carriage 10 by means of a compliant coupler 13. Coupler 13 permits limited motion of the stylus arm with respect to the carriage. The coupler may be secured directly to the carriage or alternatively, it may be secured to a cartridge (not shown) which is removably mounted in the carriage. The signal pickup stylus 14 is arranged to engage disc record 9 through an aperture 8 in the carriage.

A stylus deflector, comprising coils 15 secured to the carriage 10 (one on either side of arm 12), and permanent magnet 7 secured to the stylus arm 12, selectively imparts translation to the stylus/stylus arm in a direction radially across the disc when the coils are energized by driver circuit 20; see U.S. Pat. No. 4,183,059 entitled "Track Skipper For a Video Disc Player." The stylus deflector apparatus may be utilized to urge the stylus past "locked grooves", effect stop motion, facilitate fast forward and reverse scan as well as other special effects.

A stylus lifter/lower 16 has an arm 17 for engaging the stylus arm 12 to selectively raise or lower the stylus arm for disengagement or engagement respectively of the signal pickup stylus with the record when appropriately energized by driver circuitry 21. Typically, a lifter/lower device is an electromagnetically actuated device as in U.S. Pat. No. 4,059,277 entitled "Stylus Arm Lifting/Lowering Apparatus for a Video Disc Player System."

Pickup circuits 23, connected to the signal pickup stylus 14, cooperate therewith to convert the capacitance change manifestations of the information recorded on the disc to an electrical signal. This signal is processed and conditioned in the video and audio circuitry 25 for transmission to the antenna terminals of a conventional TV receiver 29.

The electrical manifestation of the recovered signal is also applied to circuitry 24 which extracts ancillary information recorded in the blanking intervals. Information recorded on the disc record is typically in a generally TV signal format including two fields per frame with horizontal and vertical blanking intervals. The blanking intervals provide areas within the signal for including ancillary information such as track address numbers, frame numbers, etc. For examples of encoding a TV signal with ancillary digital information and extracting such signals, see U.S. Pat. No. 3,931,457 entitled "Information Carrier Having Addressed Information Tracks", U.S. Pat. No. 4,175,267 entitled "Method and Apparatus of Inserting an Address Signal in a Video Signal", and U.S. Pat. No. 4,159,480 entitled "Method of Inserting an Address Signal in a Video Signal." Circuitry 24 conditions the extracted ancillary information to conventional logic amplitudes and format for use by the microprocessor 26. Microprocessor 26, under the control of a player program unit 28, monitors the progression of the stylus and provides for programmed special effects and monitors the progression of normal play, taking corrective action when anomalous address sequences occur. A separate control unit 27, which may be a Read Only Memory (ROM) is automatically sequenced by a system clock at the beginning of play, for example, for controlling the microprocessor to exercise the apparatus through preplay functions. For example, deflector driver 20 may be programmable, and the microprocessor may exercise the deflector to ascertain the quantum of deflection for a given energization pulse amplitude or duration and thereby calibrate the deflector system prior to beginning playback. Control unit 27 may also command the beginning of play stylus lowering and end of play stylus lifting, or carriage return functions, etc.

In FIG. 1, a stepping motor 11 is coupled via gear 19 to the toothed carriage extension 18 to provide lineal motion of the carriage in the direction denoted by the arrow designated V. Such a coupling arrangement may be effected with stepping motors which advance by relatively small increments, i.e., wherein an angular incremental step translates the carriage lineally by approximately, e.g., 0.001 inch corresponding to 8-10 tracks on the record. It should be appreciated that stepping motors having larger angular incremental steps could be coupled to the carriage with appropriate gear reduction apparatus.

Stepping motor 11 is energized by driver circuit 22 which buffers the step control signal from the microprocessor and conditions the signal to drive the motor. Driver 22 is typically a pulse amplifier conditioned to produce appropriate output signals upon the requisite microprocessor command, to produce forward or reverse steps by the motor 11.

Figure 2:
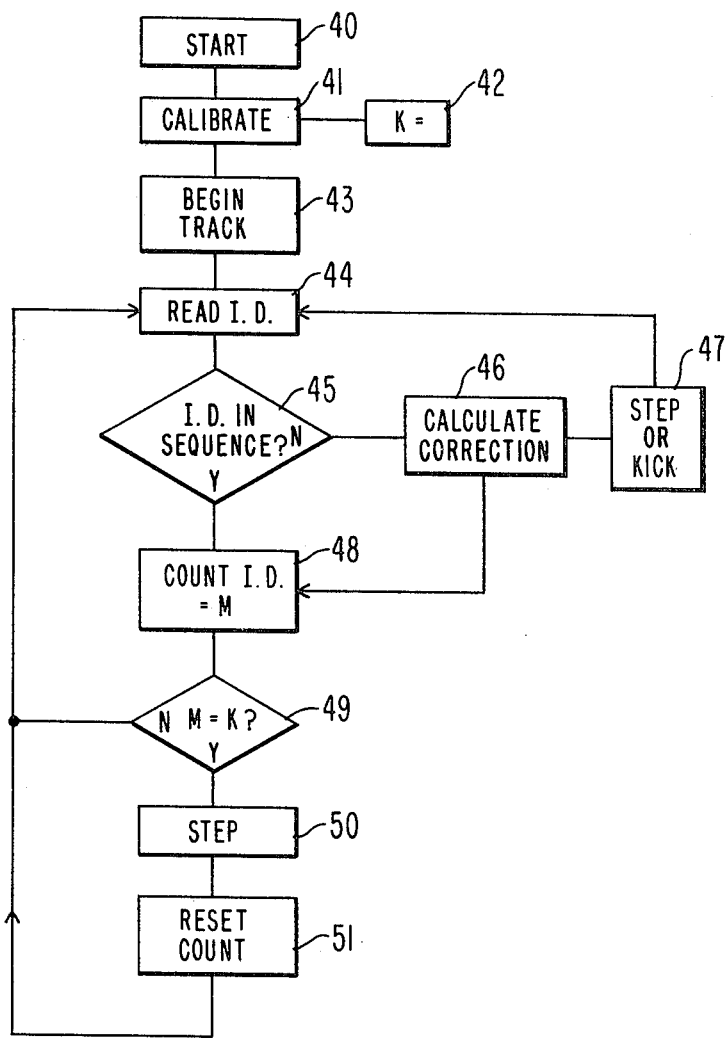
FIG. 2 is a flow chart of the system operation.

The system operation will be described with reference to the flow chart of FIG. 2 and with the presumption that the disc records contain track identification numbers in the recorded signal. When the player is energized (40) the number, K, of tracks to be traversed per step translation of the stepping motor must be set in the microprocessor (42). The value, K, is typically an integer and greater than one. If the track or convolution pitch is constant from record to record, the number, K, will be a known constant correlated with the particular stepper motor assembly and loaded in the control unit, or the pitch of the record may be included in the ancillary recorded information and located at the beginning or end of play of the record in which case the player may be programmed to fetch such number. A third alternative is to program the player to self calibrate (41) to each individual disc.

Self calibration may be performed by (a) advancing the carriage over the recorded position of the disc record, (b) lowering the stylus to read the first occurring track I.D. number, (c) disengaging the stylus and advancing the carriage one or more steps, (d) re-engaging the stylus to read the next detected track I.D. number, (e) subtracting the two I.D. numbers and dividing the difference by the number of steps between readings. The quotient is the number, K, of tracks per step. The process may be repeated one or more times to obtain an average reading without incurring appreciable preplay delay. During calibration it may be desirable to blank the video to preclude a disjointed visual display.

Once the player is calibrated, the carriage is repositioned (43) to the start of the recorded disc area, the signal pickup stylus engages the disc and play begins. As the record turns and the tracks are traversed, the I.D. numbers are extracted from the recovered signal (44) and checked to determine that each occurring track number is in the expected or proper sequence (45). If each I.D. number is sequentially proper, the number of tracks traversed by the stylus is counted (48) and each time "K" tracks have been read, the carriage is advanced (50) by one step and the track counter is reset to zero (51).

Between carriage steps the carriage remains stationary, but the stylus engaging the record, either by tracking a groove, or, by being independently servoed as in a grooveless system, is moving radially across the record. It is desirable that the average position of the stylus/stylus arm be maintained in its center or relaxed position with respect to the carriage, i.e., the stylus should be displaced equally on both sides of the relaxed position during each stepped interval, such that the stylus movement relative to the carriage takes place in an area centered about the relaxed position. Since at the commencement of play, the stylus will engage the disc at its relaxed or center position with respect to the carriage, the track count to stimulate the first step should be K/2 and thereafter K. Alternatively, when the stylus first engages the disc at the beginning of play, it may be deflected outward by the stylus deflector K/2 grooves, then every step, including the first, will be stimulated by a count of K.

If during normal play the I.D. numbers do not occur in the expected sequence (45) the microprocessor may be programmed for corrective action (46). When the track number is an obvious misread, no action may be taken, or if the stylus has skipped, e.g., a single track inward or outward, the track counter is appropriately incremented or decremented. On the other hand, if the stylus has advanced or retrogressed a significant number of tracks, then the system program may (a) appropriately adjust the counter, or (b) return the stylus to the proper track via the stylus deflection system (47), or (c) step the carriage to conform to the new stylus location (47), or (d) some combination of the above.

Once the system has been calibrated to the number of tracks per carriage step, it is a relatively simple matter to program the microprocessor to always "know" where the stylus is with respect to the carriage. The relative position of the stylus/stylus arm with respect to the carriage may affect the performance of the deflection system, but by knowing the relative stylus position, the microprocessor can compensate for such positional variations.

To institute special options such as rapid scan, the system may be programmed to successively deflect the stylus a particular number of grooves at a particular rate. The carriage will step to catch or stay even with the rapidly advancing stylus. Anytime a track I.D. number is read the required cumulative number of steps is calculated to determine whether the carriage is at a proper position.

It is emphasized that the invention is applicable to both grooved and grooveless disc record systems. Further, while the particular embodiment shown in FIG. 1 and described in the foregoing employs a microprocessor to perform numerical calculations required for the system functions, dedicated logic circuitry may be implemented in place of the microprocessor to monitor the track I.D. numbers and provide the stimulus to operate the stepper motor, deflector and lifter/lower transducers.

What is claimed is:

1. A record playback apparatus for recovering prerecorded information from disc records wherein the prerecorded information is contained in information tracks and the information includes track identification numbers, said apparatus comprising:
   a carriage assembly;
   signal recovery means mounted to the carriage assembly and arranged to engage the disc record;
   pickup circuitry cooperating with the signal recovery means for producing an electrical manifestation of the recorded information, including said track identification numbers;
   means responsive to said electrical manifestation for identifying said track identification numbers and for generating a control pulse each time a predetermined number of track numbers occur in a predetermined succession; and
   motive means mechanically coupled to the carriage assembly and responsive to said control pulses for translating the carriage in discreet steps by more than one information track radially across said disc record upon receiving each control pulse.

2. The apparatus set forth in claim 1 wherein said motive means comprises a stepping motor.

3. The apparatus set forth in claims 1 or 2 wherein the means responsive to said electrical manifestation comprises:
   means coupled to the pickup circuits for identifying the track identification numbers from the recovered signal, said numbers being available in digital format at an output terminal thereof; and
   a microprocessor arranged to receive at an input terminal thereof the digitally formatted identification numbers, said microprocessor being programmed to produce said control pulses responsive to particular combinations of said identification numbers.

4. The apparatus set forth in claim 3 further including means for conditioning said control pulses to energize the motive means therewith.

5. The apparatus set forth in claim 4 wherein the means for conditioning said control pulses comprises a pulse amplifier.

6. The apparatus set forth in claims 1 or 2 wherein the signal recovery means is secured to a first end of a stylus arm, the second end of said arm being secured to said carriage assembly by a compliant coupler for permitting limited freedom of motion of said signal recovery means relative to the carriage assembly.

7. The apparatus set forth in claim 6 further including transducer means coupled to said stylus arm and responsive to further control signals for selectively imparting displacement of the signal recovery means radially across said disc and displacement relative to the carriage assembly.

8. A record playback apparatus for recovering prerecorded information from disc records wherein the prerecorded information is contained in information tracks and the information includes track identification numbers, said apparatus comprising:
   a carriage assembly;
   signal recovery means mounted to the carriage assembly and arranged to engage the disc record;
   pickup circuitry cooperating with the signal recovery means for producing an electrical manifestation of the recorded information, including said track identification numbers;
   control means responsive to said electrical manifestation for identifying said track identification numbers and for generating a control pulse each time a predetermined number of track numbers occur in a predetermined succession;
   motive means mechanically coupled to the carriage assembly and responsive to said control pulses for translating the carriage in discreet steps by more than one information track radially across said disc record;
   means cooperating with said control means for self-calibrating the player apparatus to a disc record by determining the number of tracks the carriage and thereby the signal recovery means is translated per step of said motive means.

* * * * *

UNITED STATES PATENT AND TRADEMARK OFFICE
CERTIFICATE OF CORRECTION

PATENT NO. : 4,340,949

DATED : July 20, 1982

INVENTOR(S) : Kevin Charles Kelleher

It is certified that error appears in the above-identified patent and that said Letters Patent is hereby corrected as shown below:

Column 3, Line 66   -   "position" should be -- portion --.

Signed and Sealed this

Twenty-sixth Day of October 1982

[SEAL]

Attest:

GERALD J. MOSSINGHOFF

Attesting Officer     Commissioner of Patents and Trademarks